(12) United States Patent
Kawaguchi et al.

(10) Patent No.: US 11,679,901 B2
(45) Date of Patent: Jun. 20, 2023

(54) OPTICAL DEVICE, ATTITUDE CONTROL APPARATUS, AND SPACECRAFT

(71) Applicant: JAPAN AEROSPACE EXPLORATION AGENCY, Tokyo (JP)

(72) Inventors: Junichiro Kawaguchi, Tokyo (JP); Osamu Mori, Tokyo (JP); Toshihiro Chujo, Tokyo (JP); Hirokazu Ishida, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 88 days.

(21) Appl. No.: 16/618,205

(22) PCT Filed: Mar. 30, 2018

(86) PCT No.: PCT/JP2018/013897
§ 371 (c)(1),
(2) Date: Nov. 29, 2019

(87) PCT Pub. No.: WO2018/220990
PCT Pub. Date: Dec. 6, 2018

(65) Prior Publication Data
US 2020/0115069 A1 Apr. 16, 2020

(30) Foreign Application Priority Data
Jun. 2, 2017 (JP) .............................. JP2017-109883

(51) Int. Cl.
*B64G 1/24* (2006.01)
*G02F 1/1334* (2006.01)
(Continued)

(52) U.S. Cl.
CPC ............. *B64G 1/244* (2019.05); *G02F 1/137* (2013.01); *G02F 1/1334* (2013.01); *G02F 1/133504* (2013.01)

(58) Field of Classification Search
CPC .............................. G02F 1/1334; B64G 1/244
See application file for complete search history.

(56) References Cited

U.S. PATENT DOCUMENTS

| 5,139,578 A | 8/1992 | Valley |
| 5,305,971 A | 4/1994 | Decanini |

(Continued)

FOREIGN PATENT DOCUMENTS

| EP | 0 668 212 A1 | 8/1995 |
| EP | 0 919 463 A1 | 6/1999 |

(Continued)

OTHER PUBLICATIONS

Supplementary European Search Report dated Jan. 28, 2021 in European Application No. 18810482.2.

(Continued)

*Primary Examiner* — Edmond C Lau
(74) *Attorney, Agent, or Firm* — Saliwanchik, Lloyd & Eisenschenk

(57) ABSTRACT

To provide a sheet-like optical device capable of selectively emitting light whose optical path has a changed orientation. An optical device includes a first sheet and a second sheet. The first sheet is configured to be electrically switchable between a first state in which the first sheet extends along an in-plane direction orthogonal to a thickness direction and has transparency in the thickness direction, and a second state in which the first sheet has lower transparency in the thickness direction than the transparency in the first state. The second sheet has a prism surface on which an inclined surface inclined with respect to the in-plane direction is (Continued)

arranged along the in-plane direction, the second sheet facing the first sheet in the thickness direction.

9 Claims, 15 Drawing Sheets

(51) Int. Cl.
  *G02F 1/1335* (2006.01)
  *G02F 1/137* (2006.01)

(56) References Cited

U.S. PATENT DOCUMENTS

| | | | |
|---|---|---|---|
| 6,704,077 B1* | 3/2004 | Yoshida | G02F 1/1334 349/113 |
| 2004/0140402 A1* | 7/2004 | Wehner | B64G 1/407 244/168 |
| 2009/0079911 A1 | 3/2009 | Nagato et al. | |
| 2011/0080553 A1 | 4/2011 | Sun | |
| 2017/0242183 A1* | 8/2017 | Song | G02F 1/133621 |
| 2017/0267378 A1 | 9/2017 | Rosen | |

FOREIGN PATENT DOCUMENTS

| | | | | |
|---|---|---|---|---|
| JP | 62-96198 | A | 5/1987 | |
| JP | 8-2499 | A | 1/1996 | |
| JP | 2784571 | B2 | 8/1998 | |
| JP | 2000-98373 | A | 4/2000 | |
| JP | 2008-225335 | A | 9/2008 | |
| JP | 2009-080214 | A | 4/2009 | |
| WO | WO-2009153593 | A1 * | 12/2009 | ....... B32B 17/10036 |

OTHER PUBLICATIONS

International Search Report, in International Application No. PCT/JP2018/013897, filed Mar. 30, 2018.
Mori, O. et al., "Summary of Development and Operation of IKAROS," *Aeronautical and Space Sciences Japan*, Aug. 2012, 60(8):283-289, with English translation.
Office Action dated Apr. 15, 2021 in Japanese Application No. 2017-109883, along with its English translation.
Office Action dated Nov. 15, 2021 in Japanese Application No. 2017-109883.
Office Action dated Feb. 3, 2022 in European Application No. 18 810 482.2.

* cited by examiner

OPTICAL DEVICE, ATTITUDE CONTROL APPARATUS, AND SPACECRAFT

CROSS-REFERENCE TO RELATED APPLICATIONS

This application is the U.S. national stage application of International Patent Application No. PCT/JP2018/013897, filed Mar. 30, 2018, which claims the benefit under 35 U.S.C. § 119 of Japanese Application No. 2017-109883, filed Jun. 2, 2017, the disclosures of each of which are incorporated herein by reference in their entirety.

TECHNICAL FIELD

The present invention relates to an optical device capable of reflecting light or transmitting light therethrough, an attitude control apparatus, and a spacecraft.

BACKGROUND ART

Non-Patent Literature 1 describes a solar sail, "IKAROS". The solar sail is a space yacht including a sail that receives sunlight. In other words, the solar sail can navigate in space by using, as propulsion force, a radiation pressure that the sail receives from the sunlight.

The solar sail described in Non-Patent Literature 1 can also perform attitude control by using the radiation pressure that the sail receives from the sunlight. This sail includes optical devices for the attitude control, which are arranged along the outer edge of a light-receiving surface. Each optical device can electrically change the magnitude of the radiation pressure received from the sunlight.

Therefore, the solar sail can rotate about an optional axis along the light-receiving surface of the sail when the radiation pressure received from the sunlight is increased in only particular optical devices. Accordingly, the solar sail can perform the attitude control by which the orientation of the sail is optionally changed.

CITATION LIST

Non-Patent Literature

Patent Literature 1: Osamu MORI, Junichiro KAWAGUCHI (et al.), "Summary of Development and Operation of IKAROS", Aeronautical and Space Sciences Japan, Vol. 60, No. 8, pp. 283-289 (August 2012)

DISCLOSURE OF INVENTION

Technical Problem

In the solar sail including the optical devices described in Non-Patent Literature 1, the radiation pressure received from the sunlight does not include a component of a direction along the light-receiving surface of the sail. Therefore, it is difficult for such a solar sail to perform attitude control that needs a pressure in a direction along the light-receiving surface of the sail, such as a rotation about an axis orthogonal to the light-receiving surface of the sail.

To the contrary, if a three-dimensional structure such as a reflecting mirror capable of adjusting an angle is provided, it is possible to receive, from the sunlight, a radiation pressure having a component of a direction along the light-receiving surface of the sail. However, if such a structure is provided to the solar sail, the weight increases, and thus the consumption of fuel or electric power increases.

In view of the circumstances as described above, it is an object of the present invention to provide a sheet-like optical device capable of selectively emitting light whose optical path has a changed orientation, an attitude control apparatus, and a spacecraft.

Solution to Problem

In order to achieve the object described above, according to an embodiment of the present invention, there is provided an optical device including a first sheet and a second sheet.

The first sheet is configured to be electrically switchable between a first state in which the first sheet extends along an in-plane direction orthogonal to a thickness direction and has transparency in the thickness direction, and a second state in which the first sheet has lower transparency in the thickness direction than the transparency in the first state.

The second sheet has a prism surface on which an inclined surface inclined with respect to the in-plane direction is arranged along the in-plane direction, the second sheet facing the first sheet in the thickness direction.

The optical device is configured to be capable of reflecting or transmitting therethrough light incident in the thickness direction. The light incident on the optical device in the thickness direction is caused to change the orientation of the optical path by the prism surface provided to the second sheet in the course of reflecting the light or transmitting the light therethrough. Thus, the optical device can emit light including a component of the in-plane direction.

Further, in the optical device, the transparency of the first sheet in the thickness direction is different between the first state and the second state. Thus, in the optical device, the first sheet is switched between the first state and the second state to change the transparency of the first sheet in the thickness direction, and thus the energy level of light to be emitted can be changed.

The first sheet in the second state may diffuse light incident in the thickness direction.

The first sheet may include a liquid crystal layer formed of polymer dispersed liquid crystal.

In the first sheet having such a configuration, the light incident in the thickness direction is diffused in the second state, and thus the energy level of light to be emitted can be changed.

The second sheet may include the prism surface on a side of the first sheet.

The prism surface may reflect light transmitted through the first sheet in the thickness direction.

The prism surface may transmit, therethrough, the light transmitted through the first sheet in the thickness direction.

According to an embodiment of the present invention, there is provided an attitude control apparatus including a first sheet and a second sheet.

The first sheet is configured to be electrically switchable between a first state in which the first sheet extends along an in-plane direction orthogonal to a thickness direction and has transparency in the thickness direction, and a second state in which the first sheet has lower transparency in the thickness direction than the transparency in the first state.

The second sheet has a prism surface on which an inclined surface inclined with respect to the in-plane direction is arranged along the in-plane direction, the second sheet facing the first sheet in the thickness direction.

According to an embodiment of the present invention, there is provided a spacecraft including a light-receiving surface and an attitude control apparatus provided to the light-receiving surface.

The attitude control apparatus includes a first sheet and a second sheet.

The first sheet is configured to be electrically switchable between a first state in which the first sheet extends along the light-receiving surface and has transparency in a thickness direction orthogonal to the light-receiving surface, and a second state in which the first sheet has lower transparency in the thickness direction than the transparency in the first state.

The second sheet has a prism surface on which an inclined surface inclined with respect to the light-receiving surface is arranged along the light-receiving surface, the second sheet facing the first sheet in the thickness direction.

The spacecraft may include a plurality of attitude control apparatuses in which inclined surfaces have orientations different from one another.

Advantageous Effects of Invention

According to the present invention, it is possible to provide a sheet-like optical device capable of selectively emitting light whose optical path has a changed orientation, an attitude control apparatus, and a spacecraft.

BRIEF DESCRIPTION OF DRAWINGS

FIG. 16(A) to (C) are partial cross-sectional views in which FIG. 16(A) to (C) show the process of forming the prism surface by thermal nanoimprint.

MODE(S) FOR CARRYING OUT THE INVENTION

Hereinafter, an embodiment of the present invention will be described with reference to the drawings. However, the present invention is not narrowly interpreted through the following embodiment. Further, each figure shows the X-axis, the Y-axis, and the Z-axis orthogonal to one another as appropriate. The X-axis, the Y-axis, and the Z-axis are common in all the figures.

1. Basic Configuration of Optical Device 1

Figure 1:
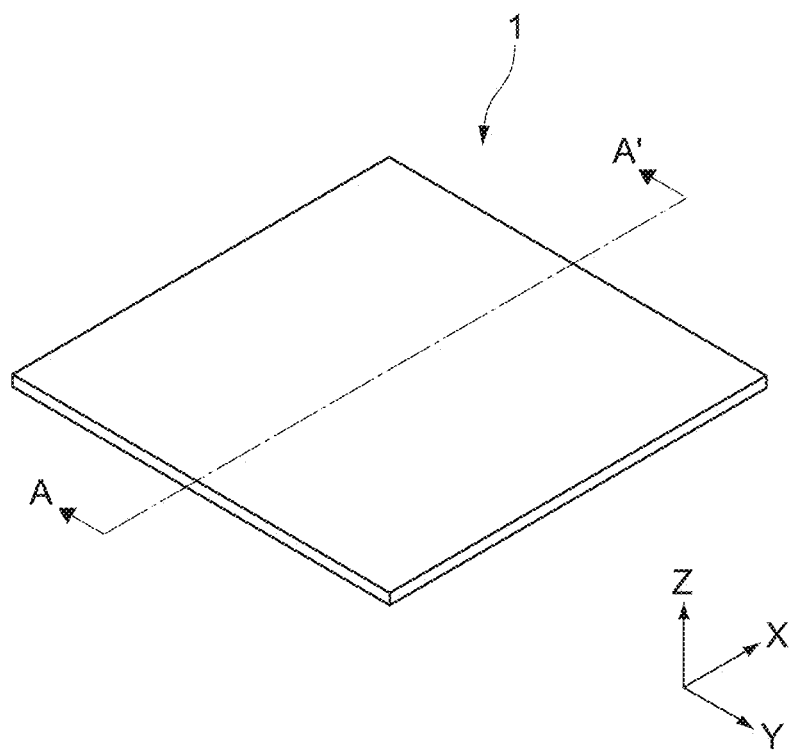
FIG. 1 is a perspective view of an optical device according to an embodiment of the present invention.
Figure 2:
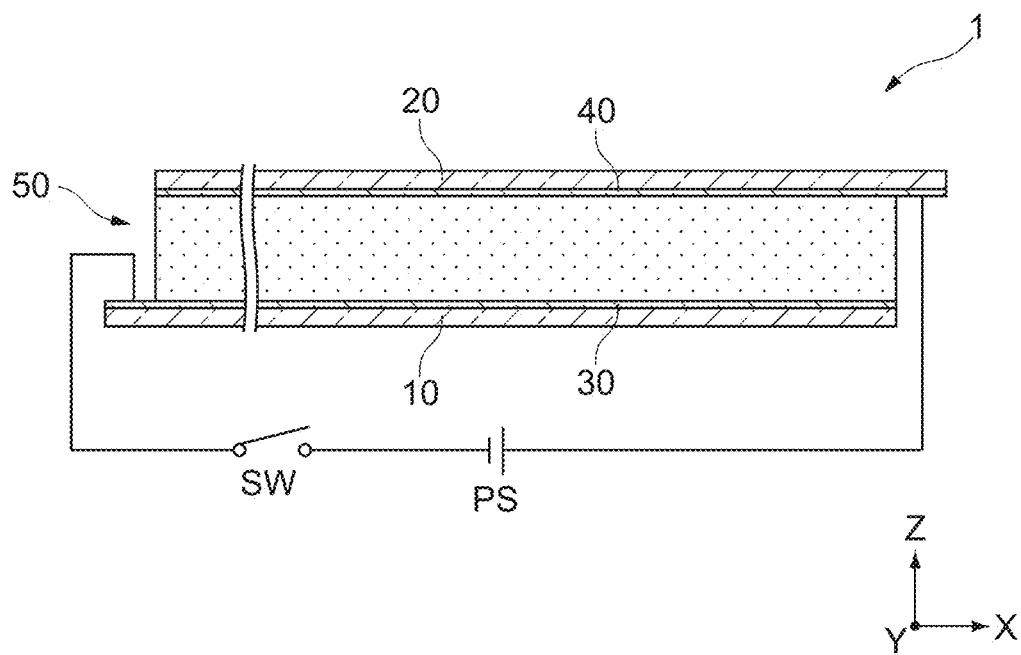
FIG. 2 is a cross-sectional view of the optical device taken along the line A-A' of FIG. 1.

FIG. 1 is a perspective view of an optical device 1 according to an embodiment of the present invention. FIG. 2 is a cross-sectional view of the optical device 1 taken along the line A-A' of FIG. 1. The optical device 1 has a sheet-like shape extending along the XY-plane and having flexibility. In other words, in the optical device 1, a thickness direction is the Z-axis direction, and an in-plane direction is a direction along the XY-plane. The optical device 1 is favorably a thin film-like optical device.

The optical device 1 is configured as a reflective or transmissive optical device. A reflective optical device 1 can reflect light incident from the upper side in the Z-axis direction and emit the light upward in the Z-axis direction. A transmissive optical device 1 can transmit therethrough light incident from the upper side in the Z-axis direction and emit the light downward in the Z-axis direction.

The optical device 1 includes a first base material 10, a second base material 20, a first electrode film 30, a second electrode film 40, and a liquid crystal layer 50. The first base material 10 and the second base material 20 are film members facing each other in the Z-axis direction. The first electrode film 30 is formed on the upper surface of the first base material 10 in the Z-axis direction. The second electrode film 40 is formed on the lower surface of the second base material 20 in the Z-axis direction.

In this embodiment, the optical device 1 includes a first sheet and a second sheet. The first sheet of the optical device 1 includes the first electrode film 30, the second electrode film 40, and the liquid crystal layer 50. Further, in the optical device 1, at least one of the first base material 10 or the second base material 20 is the second sheet.

In each of the reflective and transmissive optical devices 1, the second base material 20 and the second electrode film 40 are transparent. The second base material 20 can be formed of, for example, a transparent material such as polyimide. The second electrode film 40 can be, for example, a transparent conductive film of indium tin oxide (ITO) or the like.

In the reflective optical device 1, the first electrode film 30 has a function as an electrode and also a function as a reflecting mirror that reflects light. Thus, the first electrode film 30 can be, for example, a metal film such as an aluminum deposited film. The first base material 10 can be similar to the second base material 20, but it can be formed of an optional material.

In the transmissive optical device 1, the first base material 10 and the first electrode film 30 are also transparent as with the case of the second base material 20 and the second electrode film 40. The first base material 10 can be formed of a transparent material similar to that of the second base material 20. Further, the first electrode film 30 can be a transparent conductive film similar to that of the second electrode film 40.

The liquid crystal layer 50 is disposed between the first electrode film 30 and the second electrode film 40 that face each other in the Z-axis direction. A power supply PS and a switch SW are connected in series to the first electrode film 30 and the second electrode film 40. When the switch SW is turned on, the power supply PS is connected to the first electrode film 30 and the second electrode film 40, and a voltage is applied to the liquid crystal layer 50 in the Z-axis direction.

In other words, by operation of the switch SW, the optical device 1 can switch between a first state in which a voltage is applied to the liquid crystal layer 50 in the Z-axis direction and a second state in which a voltage is not applied to the liquid crystal layer 50. The liquid crystal layer 50 constitutes the first sheet together with the first electrode film 30 and the second electrode film 40. The first sheet is configured to be capable of switching the transparency in the Z-axis direction between the first state and the second state.

Figure 3:
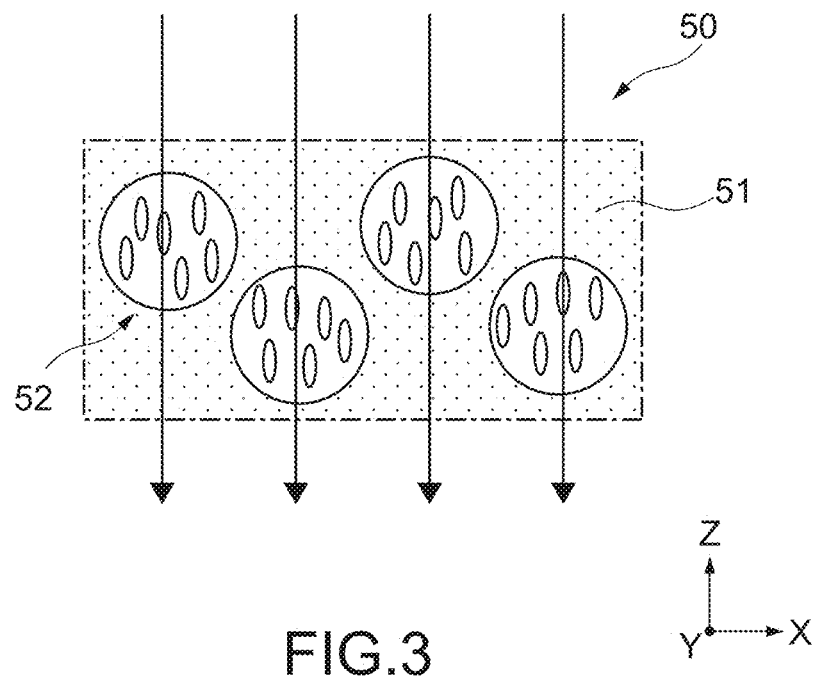
FIG. 3 is a partial cross-sectional view showing a microstructure of a liquid crystal layer in a first state in which a voltage is applied in a Z-axis direction.
Figure 4:
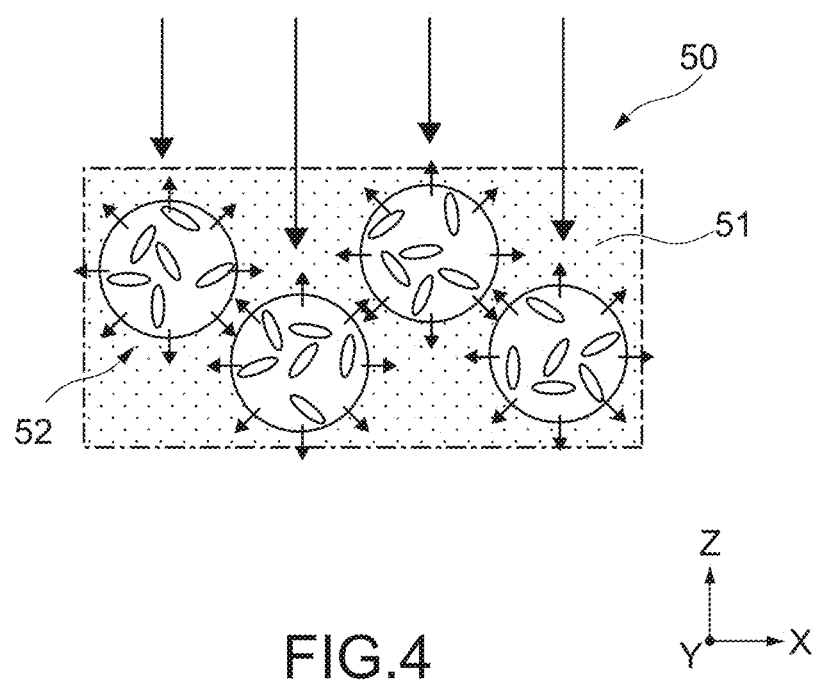
FIG. 4 is a partial cross-sectional view showing a microstructure of the liquid crystal layer in a second state in which a voltage is not applied in the Z-axis direction.

FIGS. 3 and 4 are each a partial cross-sectional view showing in an enlarged manner the liquid crystal layer 50 of the optical device 1. FIGS. 3 and 4 schematically show a microstructure of the liquid crystal layer 50. FIG. 3 shows the liquid crystal layer 50 in the first state in which a voltage is applied in the Z-axis direction. FIG. 4 shows the liquid crystal layer 50 in the second state in which a voltage is not applied in the Z-axis direction.

The liquid crystal layer 50 is formed of polymer dispersed liquid crystal (PDLC). In other words, the liquid crystal layer 50 has a configuration in which liquid crystal droplets 52 are dispersed in a polymeric material 51. Liquid crystal molecules constituting the droplets 52 are anisotropic.

In the liquid crystal layer 50 in the first state in which a voltage is applied in the Z-axis direction, which is shown in FIG. 3, the liquid crystal molecules constituting the droplets 52 are oriented in the Z-axis direction. At that time, the liquid crystal layer 50 transmits light incident in the Z-axis direction therethrough as it is. Thus, the liquid crystal layer 50 in the first state has high transparency in the Z-axis direction.

In the liquid crystal layer 50 in the second state in which a voltage is not applied in the Z-axis direction, which is shown in FIG. 4, the liquid crystal molecules constituting the droplets 52 are oriented in random directions. At that time, the droplets 52 dispersed in the liquid crystal layer 50 diffuse the light incident in the Z-axis direction. Thus, the liquid crystal layer 50 in the second state has lower transparency in the Z-axis direction than that in the first state.

In each of the reflective and transmissive optical devices 1, the energy of light to be emitted differs between the first state in which the liquid crystal layer 50 has high transparency in the Z-axis direction and the second state in which the liquid crystal layer 50 has low transparency in the Z-axis direction. In other words, in the optical device 1, the energy level of light to be emitted can be electrically switched.

In the optical device 1, at least one of the first base material 10 or the second base material 20 is configured as the second sheet including a prism surface 60 formed along the XY-plane. The prism surface 60 reflects or refracts light incident on the optical device 1 in the Z-axis direction and thus inclines, with respect to the Z-axis, the optical path of light to be emitted from the optical device 1 in the first state.

2. Detailed Configuration of Optical Device 1

2.1 Reflective Optical Device 1

Figure 5:
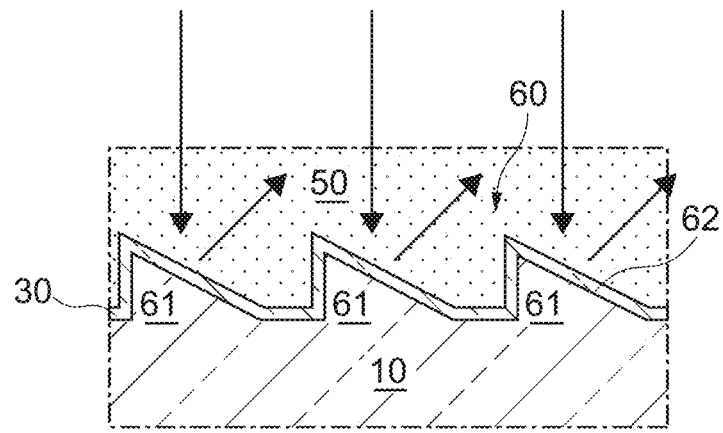
FIG. 5 is a partial cross-sectional view showing as an example a prism surface of a reflective optical device.
Figure 5:
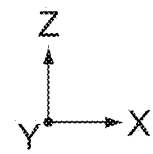
Figure 6:
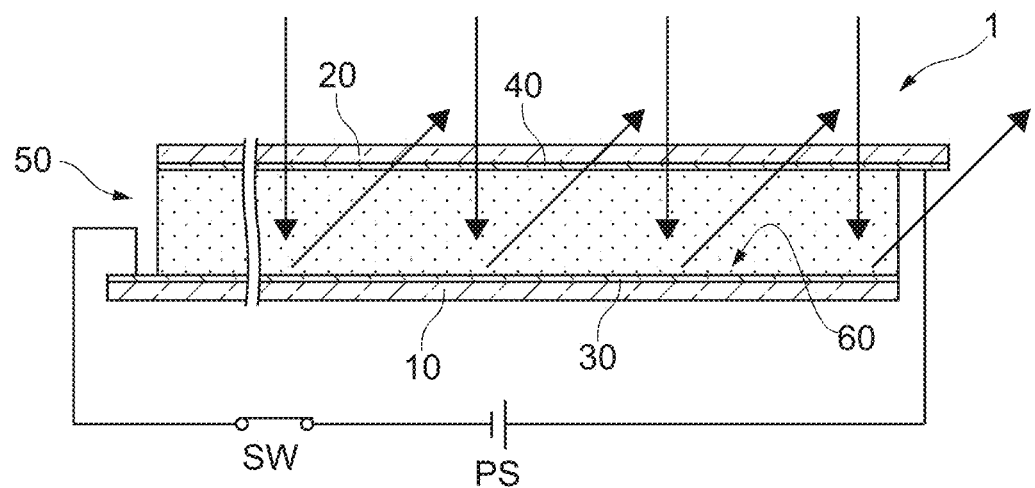
FIG. 6 is a cross-sectional view showing an optical path of light reflected by the reflective optical device (in the first state).
Figure 6:
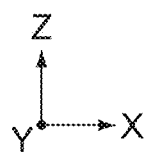
Figure 7:
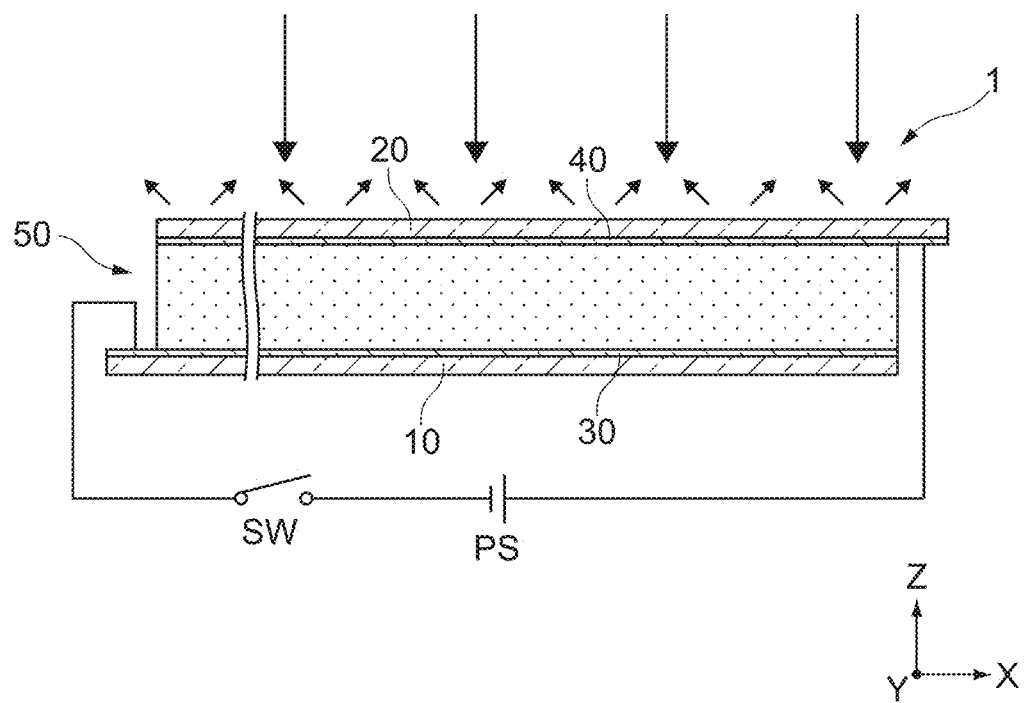
FIG. 7 is a cross-sectional view showing an optical path of light diffused by the reflective optical device (in the second state).

FIGS. 5 to 7 each show an example of the reflective optical device 1. In the reflective optical device 1 shown in FIGS. 5 to 7, the prism surface 60 is provided to the upper surface of the first base material 10 in the Z-axis direction. FIG. 5 is a partial cross-sectional view showing in an enlarged manner the vicinity of the prism surface 60 provided to the upper surface of the first base material 10 in the Z-axis direction.

As shown in FIG. 5, the prism surface 60 includes prisms 61 extending along the Y-axis direction and arranged along the X-axis direction. Each of the prisms 61 includes an inclined surface 62, which is inclined at a constant angle in the X-axis direction with respect to the XY-plane. The prism 61 is unsymmetrically formed so as to increase the area of the inclined surface 62. The prism 61 is typically a right angle prism.

A dimension of each prism 61 in the X-axis direction can be set to, for example, approximately 10 to 30 μm. A dimension of each prism 61 in the Z-axis direction can be set to, for example, approximately 1 to 10 μm. An angle of the inclined surface 62 with respect to the XY-plane can be set to, for example, approximately 10 to 45°. The prisms 61 may be disposed with intervals therebetween in the X-axis direction or may be disposed without intervals.

The prism surface 60 provided to the first base material 10 is covered with the first electrode film 30 of a metal film. Thus, the prism surface 60 functions as a reflecting mirror that reflects light incident in the Z-axis direction. As shown in FIG. 5, the optical path of light reflected on the inclined surface 62 of each prism 61 is inclined in the X-axis direction.

Thus, as shown in FIG. 6, in the optical device 1 in the first state in which the switch SW is turned on, the light incident from the upper side in the Z-axis direction is reflected on the prism surface 60 covered with the first electrode film 30 and then obliquely emitted with the optical path being inclined in the X-axis direction. Therefore, the light emitted by the optical device 1 in the first state includes a component of the X-axis direction.

Further, since the liquid crystal constituting the droplets 52 of the liquid crystal layer 50 has polarization property (birefringent property), when the light reflected on the prism surface 60 obliquely travels in the liquid crystal layer 50 as shown in FIG. 6, the liquid crystal exhibits anisotropy with respect to the plane of polarization, and scattering is caused by the plane of polarization. Accordingly, the energy loss of light is liable to occur. In order to suppress such energy loss of light, for example, it is effective to provide a ½ wavelength plate to the upper surface of the second base material 20 in the Z-axis direction.

As shown in FIG. 7, in the second state in which the switch SW is turned off, the light incident from the upper side in the Z-axis direction is diffused by the liquid crystal layer 50. Accordingly, in the optical device 1, diffused light including mixed components of various directions is emitted. The diffused light emitted in the second state has energy (or radiation pressure) different from that of the light in the oblique direction, which is emitted in the first state.

Figure 8:
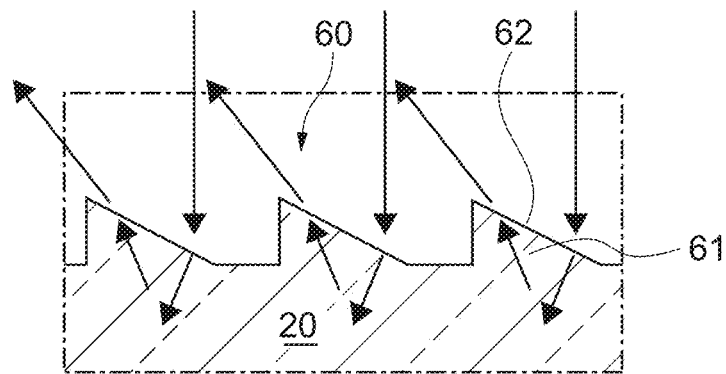
FIG. 8 is a partial cross-sectional view showing in an enlarged manner the prism surface provided to the upper surface, in the Z-axis direction, of a second base material of the reflective optical device.
Figure 8:
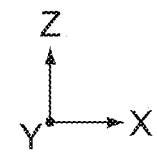

It should be noted that the prism surface 60 of the reflective optical device 1 may be provided not to the upper surface of the first base material 10 in the Z-axis direction, but to the upper surface or the lower surface of the second base material 20 in the Z-axis direction. As an example, FIG. 8 is a partial cross-sectional view showing in an enlarged manner the vicinity of the prism surface 60 provided to the upper surface of the second base material 20 in the Z-axis direction. The prism surface 60 has a configuration similar to the configuration shown in FIG. 5. Additionally, the prism surface 60 may be provided to the lower surface of the reflective first base material 10 in the Z-axis direction. In this case, the first electrode film 30 is formed on the lower surface of the first base material 10 in the Z-axis direction. In the first state, the light that has passed also through the first base material 10 is reflected on the prism surface 60.

In the optical device 1 of such a configuration, the light incident on the prism surface 60 from the upper side in the Z-axis direction is refracted on the inclined surface 62 of each prism 61 in the X-axis direction. Further, in the optical device 1, the light emitted from the prism surface 60 upward in the Z-axis direction is further refracted on the inclined surface 62 of each prism 61 in the X-axis direction.

Figure 9:
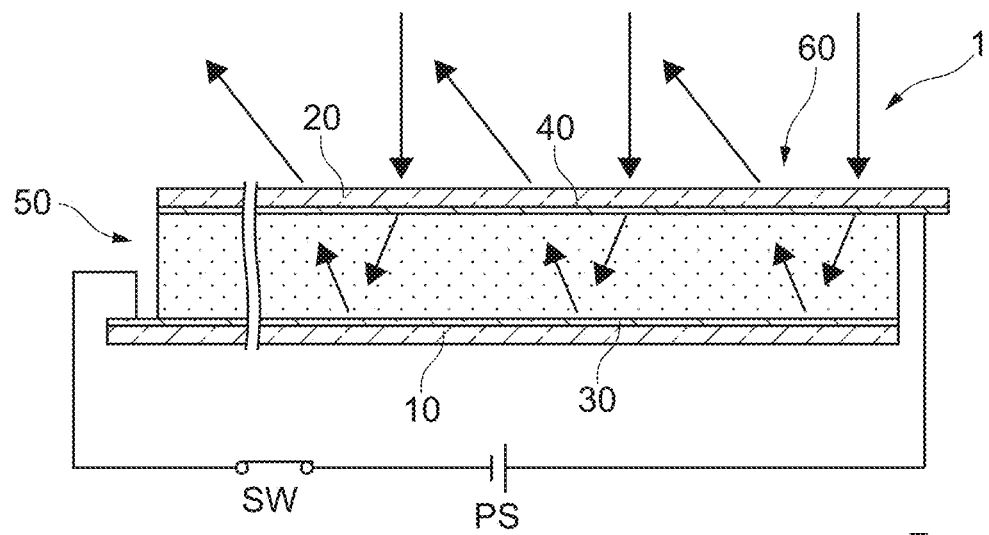
FIG. 9 is a cross-sectional view showing an optical path of light reflected by the reflective optical device (in the first state) including the prism surface of FIG. 8.
Figure 9:
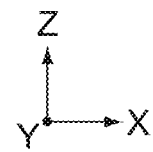

In other words, as shown in FIG. 9, in the optical device 1 in the first state in which the switch SW is turned on, the light incident from the upper side in the Z-axis direction is refracted on the prism surface 60 twice before and after the light is reflected on the planar first electrode film 30. Thus, in the optical device 1 in the first state, light including a component of the X-axis direction is emitted.

It should be noted that the reflective optical device 1 may be configured by a combination of a plurality of prism surfaces 60. In other words, the optical device 1 may include the prism surfaces 60 on a plurality of surfaces among three surfaces including the upper surface of the first base material 10 in the Z-axis direction, the upper surface of the second base material 20 in the Z-axis direction, and the lower surface of the second base material 20 in the Z-axis direction.

2.2 Transmissive Optical Device 1

Figure 10:
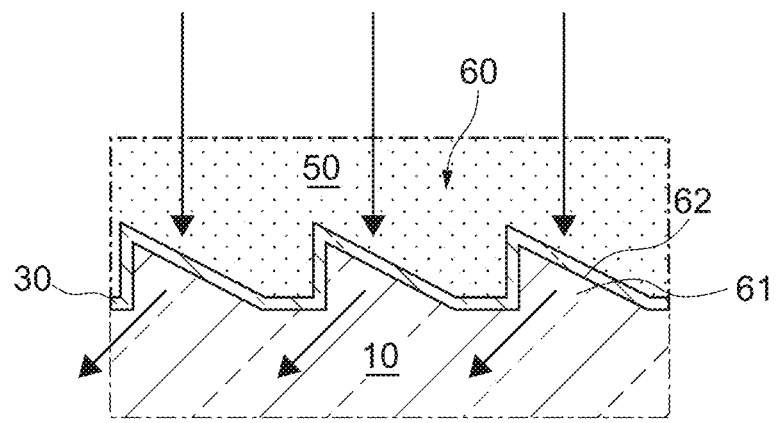
FIG. 10 is a partial cross-sectional view showing as an example a prism surface of a transmissive optical device.
Figure 11:
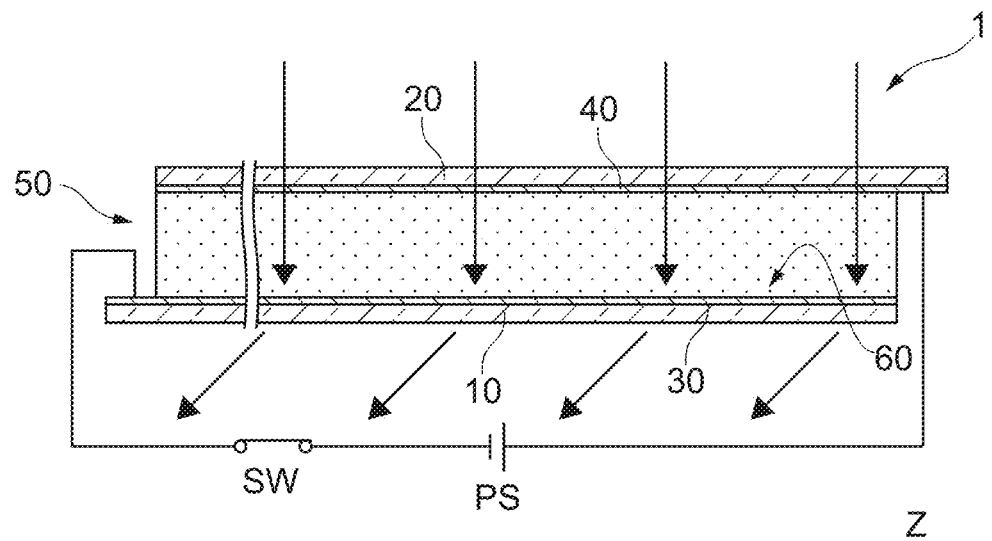
FIG. 11 is a cross-sectional view showing an optical path of light transmitted through the transmissive optical device (in the first state).
Figure 12:
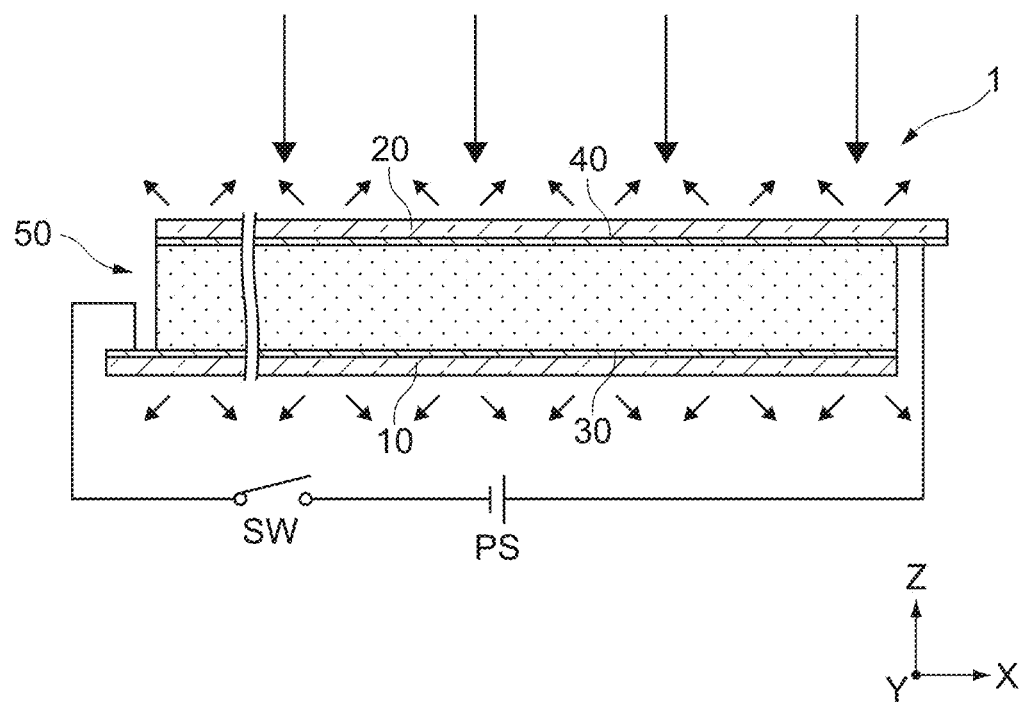
FIG. 12 is a cross-sectional view showing an optical path of light diffused by the transmissive optical device (in the second state).

FIGS. 10 to 12 each show an example of the transmissive optical device 1. In the transmissive optical device 1 shown in FIGS. 10 to 12, the prism surface 60 similar to that of the reflective optical device 1 shown in FIGS. 5 to 7 is provided. FIG. 10 is a partial cross-sectional view showing in an enlarged manner the vicinity of the prism surface 60 provided to the upper surface of the first base material 10 in the Z-axis direction.

The prism surface 60 provided to the first base material 10 is covered with the first electrode film 30 of a transparent conductive film. Thus, the prism surface 60 transmits light incident in the Z-axis direction therethrough. As shown in FIG. 10, the light transmitted through the prism surface 60 is refracted in the X-axis direction on the inclined surface 62 of each prism 61.

Thus, as shown in FIG. 11, in the optical device 1 in the first state in which the switch SW is turned on, the light incident from the upper side in the Z-axis direction is refracted on the prism surface 60 and then obliquely emitted with the optical path being inclined in the X-axis direction. In other words, the light emitted by the optical device 1 in the first state includes a component of the X-axis direction.

As shown in FIG. 12, in the second state in which the switch SW is turned off, the light incident from the upper side in the Z-axis direction is diffused by the liquid crystal layer 50. Accordingly, in the optical device 1, diffused light including mixed components of various directions is emitted. The diffused light emitted in the second state has energy (or radiation pressure) different from that of the light in the oblique direction, which is emitted in the first state.

Figure 13:
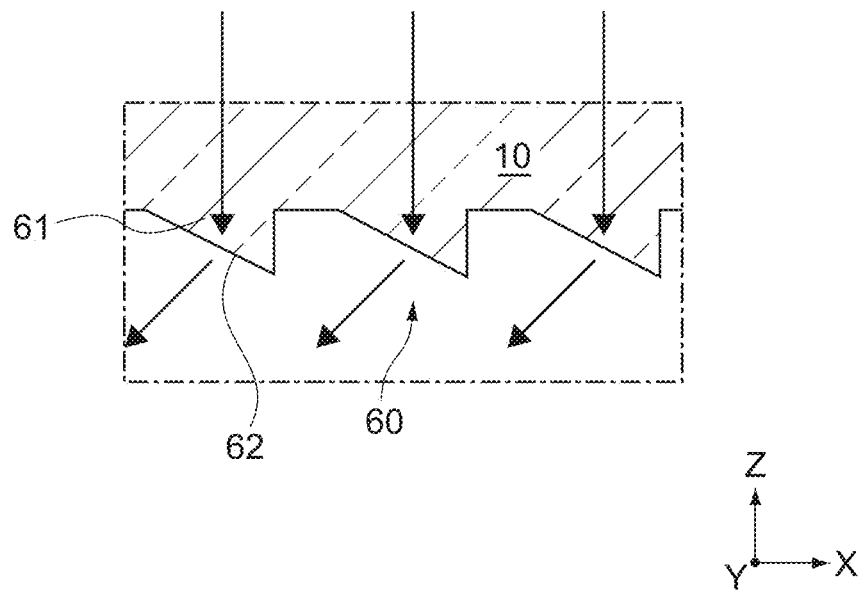
FIG. 13 is a partial cross-sectional view showing in an enlarged manner the prism surface provided to the lower surface, in the Z-axis direction, of a first base material of the transmissive optical device.

It should be noted that the prism surface 60 of the transmissive optical device 1 may be provided not to the upper surface of the first base material 10 in the Z-axis direction, but to the lower surface of the first base material 10 in the Z-axis direction, the upper surface of the second base material 20 in the Z-axis direction, or the lower surface of the second base material 20 in the Z-axis direction. As an example, FIG. 13 is a partial cross-sectional view showing in an enlarged manner the vicinity of the prism surface 60 provided to the lower surface of the first base material 10 in the Z-axis direction.

Figure 14:
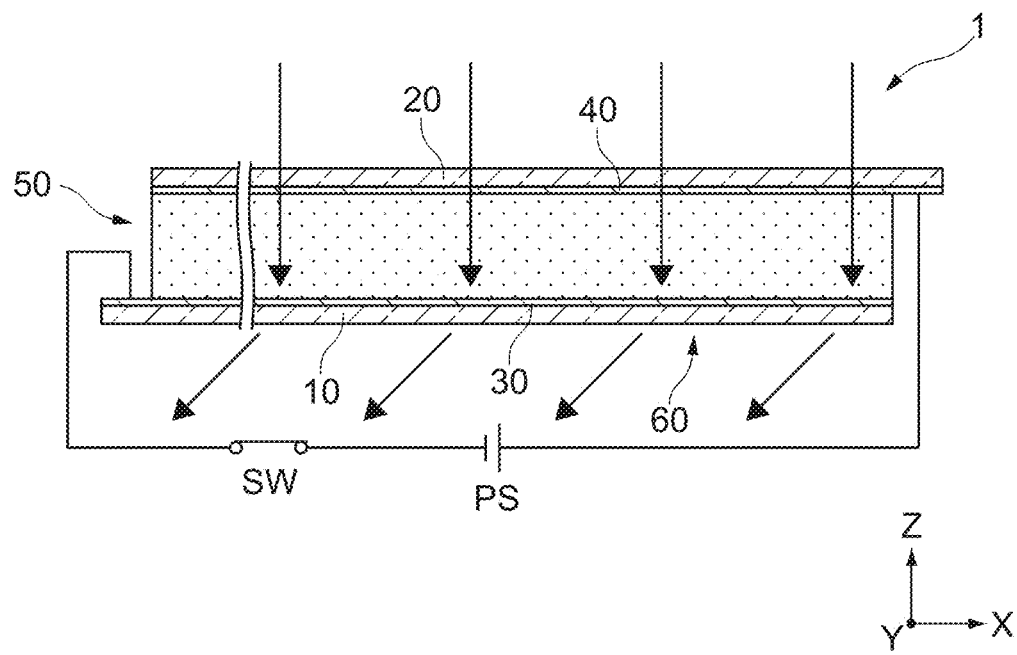
FIG. 14 is a cross-sectional view showing an optical path of light transmitted through the transmissive optical device (in the first state) including the prism surface of FIG. 13.

In the optical device 1 of such a configuration, the light emitted from the prism surface 60 is refracted on the inclined surface 62 of each prism 61 in the X-axis direction. Thus, as shown in FIG. 14, in the optical device 1 in the first state in which the switch SW is turned on, the light incident from the upper side in the Z-axis direction is obliquely emitted with the optical path being inclined in the X-axis direction on the prism surface 60.

It should be noted that the transmissive optical device 1 may be configured by a combination of a plurality of prism surfaces 60. In other words, the optical device 1 may include the prism surfaces 60 on a plurality of surfaces among four surfaces including the upper surface of the first base material 10 in the Z-axis direction, the lower surface of the first base material 10 in the Z-axis direction, the upper surface of the second base material 20 in the Z-axis direction, and the lower surface of the second base material 20 in the Z-axis direction.

2.3 Modified Example

The first sheet of the optical device 1, which is electrically switchable between the first state and the second state, is not limited to the liquid crystal layer 50 described above. In other words, it is sufficient that the first sheet is configured to be electrically switchable between the first state in which the first sheet has transparency in the Z-axis direction and the second state in which the first sheet has lower transparency in the Z-axis direction than that in the first state.

Specifically, the first sheet does not need to be configured to diffuse light in the second state. For example, the first sheet may be a light shutter capable of reducing transparency by blocking light in the second state. Examples of the light shutter include a liquid crystal light shutter and a piezoelectric light shutter.

The liquid crystal light shutter typically has a configuration in which a liquid crystal layer is sandwiched between two polarizers having polarization axes orthogonal to each other. Examples of adoptable types of the liquid crystal light shutter include a twisted nematic (TN) type, a vertical alignment (VA) type, and an in-plane-switching (IPS) type.

3. Method of Forming Prism Surface 60

The prism surface 60 can be formed by, for example, stamping. Examples of stamping techniques capable of forming the prism surface 60 include thermal nanoimprint, embossing, and debossing. Hereinafter, description will be given on an example of forming the prism surface 60 on the upper surface of the first base material 10 in the Z-axis direction by thermal nanoimprint.

Figure 15:
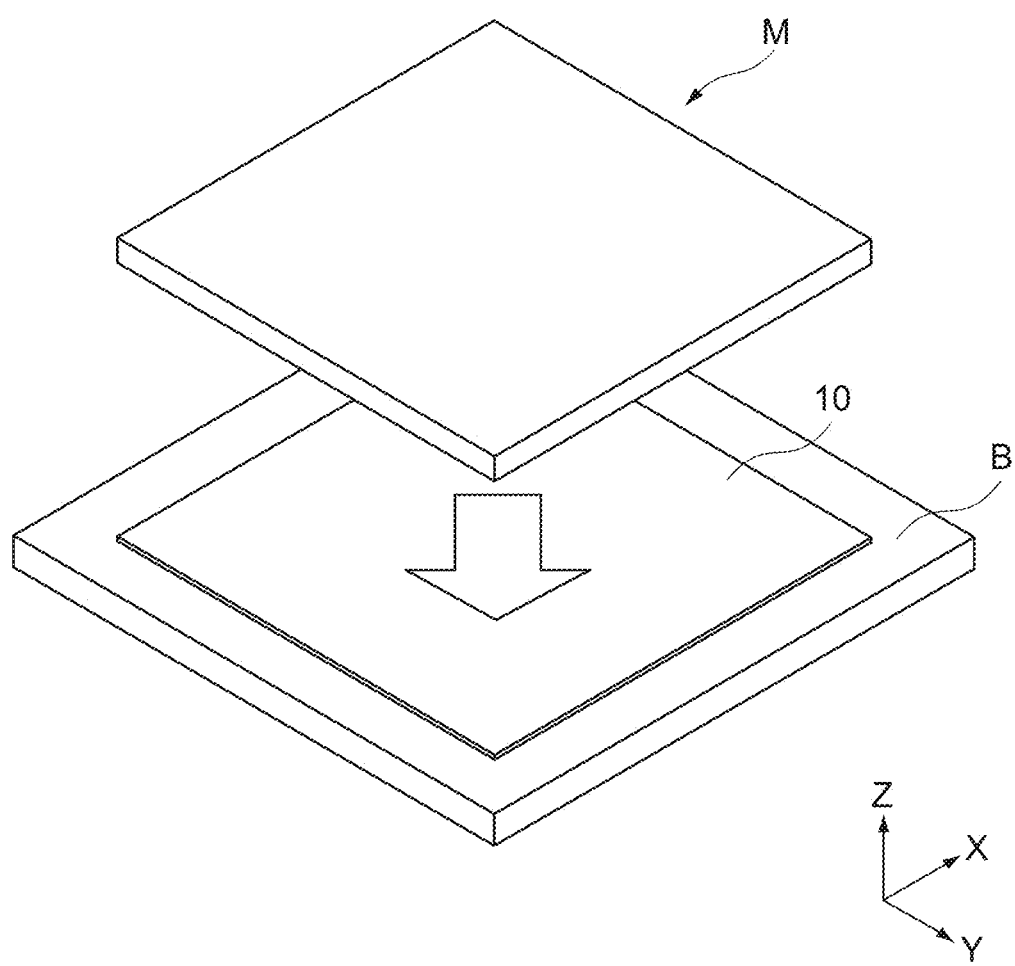
FIG. 15 is a perspective view showing a method of forming the prism surface by thermal nanoimprint.

FIG. 15 is a view showing a method of forming the prism surface 60 by thermal nanoimprint. In thermal nanoimprint, a holding plate B for holding the first base material 10, and a mold M having a transfer pattern for the prism surface 60 on the lower surface in the Z-axis direction are used. In other words, the transfer pattern of the mold M is transferred to the upper surface of the first base material 10 in the Z-axis direction, the first base material 10 being held by the holding plate B.

Figure 16A:
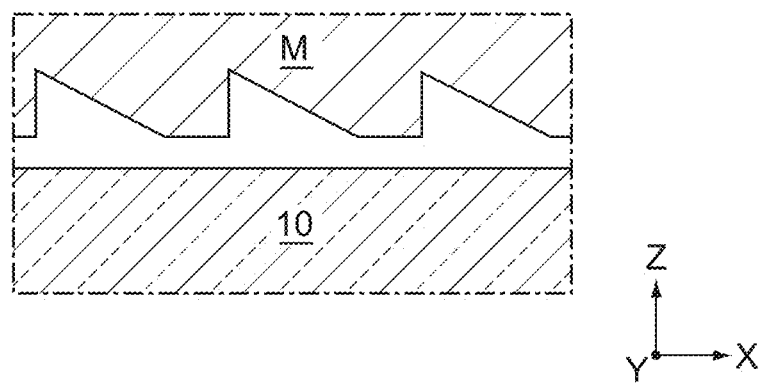
Figure 16B:
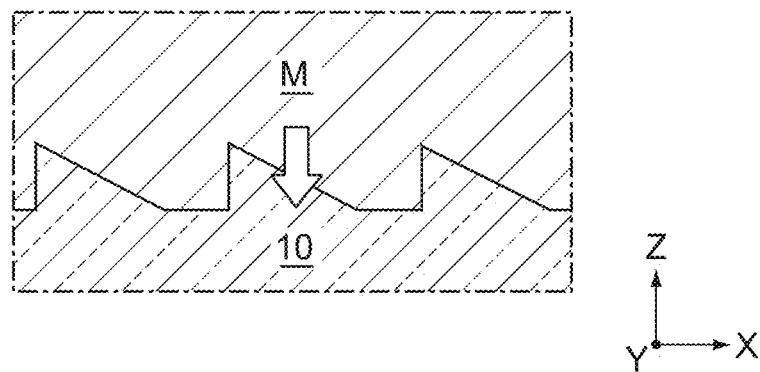
Figure 16C:
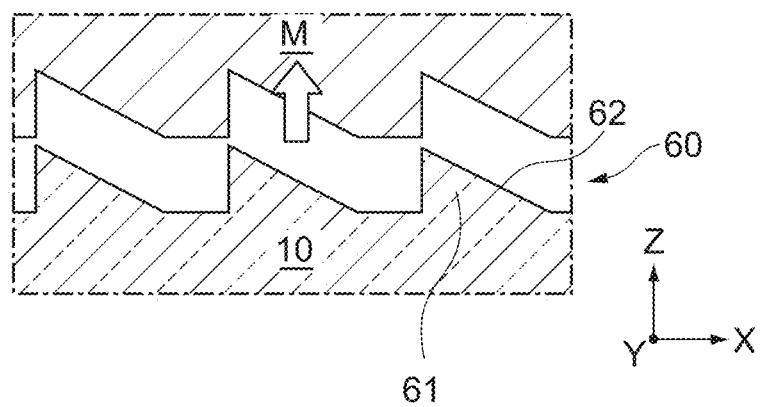

FIG. 16(A) to (C) are partial cross-sectional views in which FIG. 16(A) to (C) show the process of forming the prism surface 60 by thermal nanoimprint. In FIG. 16(A) to (C), FIG. 16(A) to (C) show in an enlarged manner the vicinity of the upper surface of the first base material 10 in the Z-axis direction, on which the prism surface 60 is to be formed. First, as shown in FIG. 16(A), the mold M is disposed to face the first base material 10.

Next, in a state where the holding plate B is heated to increase the temperature of the first base material 10 to be equal to or higher than a glass transition temperature such that the first base material 10 is sufficiently softened, the mold M is pressed against the first base material 10 as shown in FIG. 16(B). Accordingly, the upper surface of the first base material 10 in the Z-axis direction is deformed along the transfer pattern of the mold M.

Subsequently, in a state where the holding plate B is cooled to reduce the temperature of the first base material 10 to be lower than the glass transition temperature, the mold M is detached from the first base material 10 as shown in FIG. 16(C). Accordingly, the prism surface 60 is formed on the upper surface of the first base material 10 in the Z-axis direction. It should be noted that the prism surface 60 can also be formed on the second base material 20 in a similar manner.

The method of forming the prism surface 60 is not limited to the stamping. For example, the prism surface 60 may be formed by fine cutting work. Further, the prism surface 60 may be formed by various etching techniques. Additionally, the prism surface 60 may be formed by an additive manufacturing method using a 3D printer or the like.

4. Application Examples of Optical Device 1

Application examples of the optical device 1 will be described. In this section, a spacecraft 100, a dimming window 200, a sunlight power generation system 300, and a projection system 400 will be described as application examples of the optical device 1. However, the optical device 1 is not limited to those application examples to be described below and can be used for various use applications.

4.1 Spacecraft 100

Figure 17:
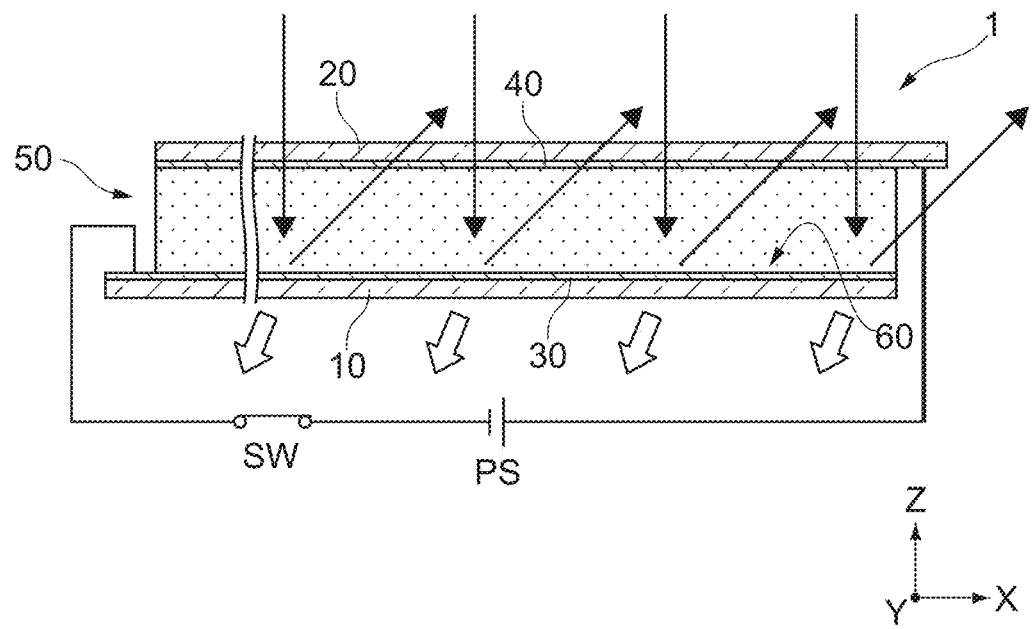
FIG. 17 is a cross-sectional view showing an orientation of a radiation pressure received from the light reflected by the reflective optical device (in the first state).

The optical device 1 can be used as an attitude control apparatus of the spacecraft 100 using a radiation pressure received from sunlight. First, with reference to FIGS. 17 and 18, description will be given on a radiation pressure that the reflective and transmissive optical devices 1 receive from light incident in the Z-axis direction. FIG. 17 corresponds to FIG. 6, and FIG. 18 corresponds to FIG. 11.

FIG. 17 shows the direction of the radiation pressure by using block arrows, the radiation pressure being received by the reflective optical device 1 in the first state from the light incident from the upper side in the Z-axis direction. In such an optical device 1, an optical path of light is inclined in the X-axis direction (in the negative direction of the X-axis) with respect to the Z-axis direction by the action of the prism surface 60, and the light is then emitted. Thus, the radiation pressure including a component of the Z-axis direction and a component of the X-axis direction is added.

Figure 18:
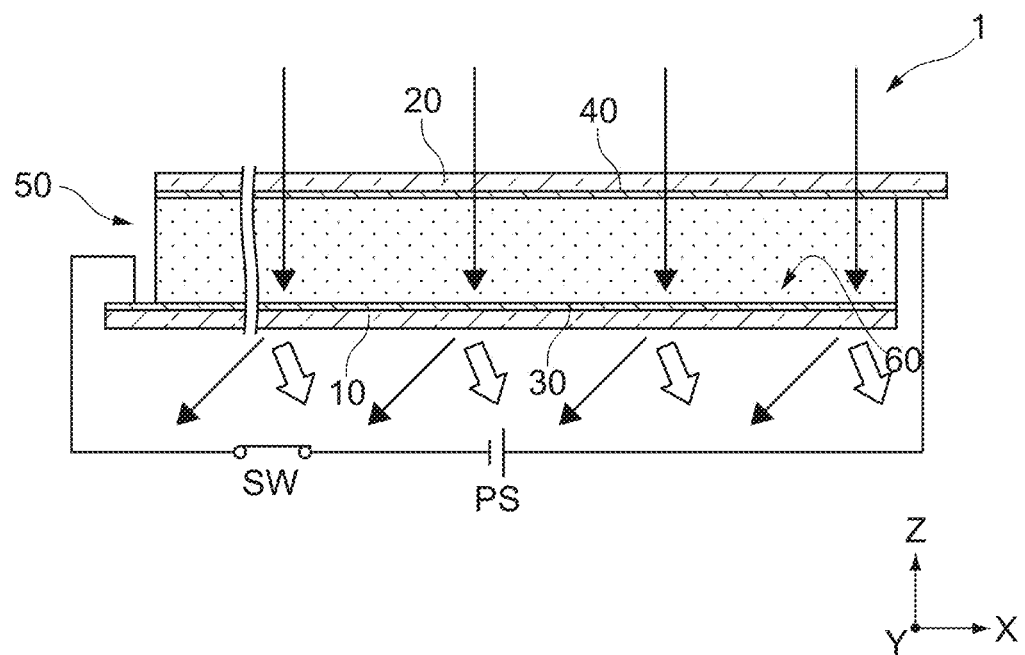
FIG. 18 is a cross-sectional view showing an orientation of a radiation pressure received from the light transmitted through the transmissive optical device (in the first state).

FIG. 18 shows the direction of the radiation pressure by using block arrows, the radiation pressure being received by the transmissive optical device 1 in the first state from the light incident from the upper side in the Z-axis direction. In such an optical device 1, an optical path of light is inclined in the X-axis direction (in the positive direction of the X-axis) with respect to the Z-axis direction by the action of the prism surface 60, and the light is then emitted. Thus, the radiation pressure including a component of the Z-axis direction and a component of the X-axis direction is added.

In such a manner, in the optical device 1 in the first state, each of the reflective and transmissive optical devices can receive the radiation pressure including not only the component of the Z-axis direction but also the component of the X-axis direction from the light incident in the Z-axis direction. Further, in the optical device 1, the energy of light to be emitted differs between the first state and the second state, and thus the radiation pressure to be received from the light incident from the upper side in the Z-axis direction is also different therebetween.

Figure 19:
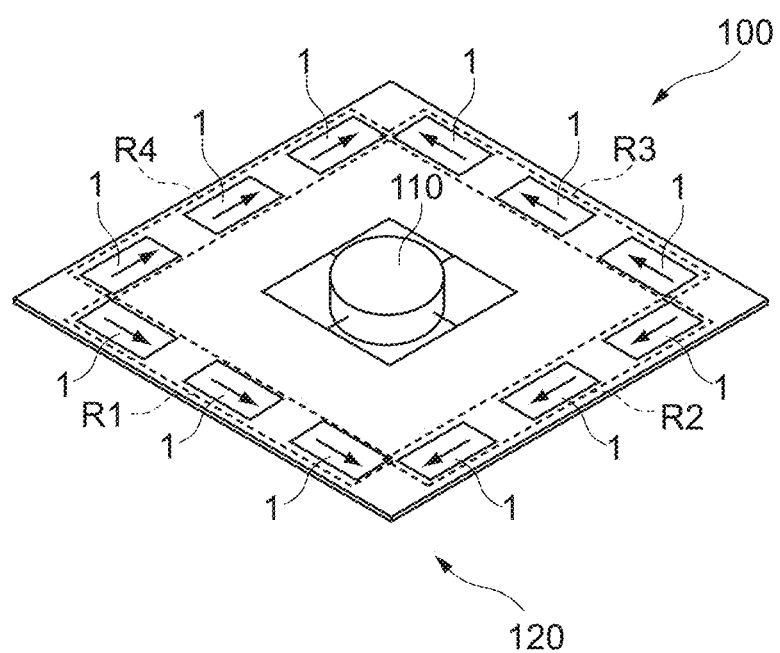
FIG. 19 is a perspective view of a spacecraft using the optical devices.

FIG. 19 is a perspective view of the spacecraft 100 using the optical devices 1. The spacecraft 100 is a solar sail including an aircraft body 110 and a rectangular sail 120 two-dimensionally extending around the aircraft body 110. In the spacecraft 100, a plurality of optical devices 1 are attached to a light-receiving surface of the sail 120 that receives sunlight.

More specifically, three optical devices 1 are arranged in each of regions R1 to R4 provided along the four sides of the light-receiving surface of the sail 120. FIG. 19 shows, by using arrows, the orientation of the component of the X-axis direction of the radiation pressure received by each of the optical devices 1. The component of the X-axis direction of the radiation pressure in each optical device 1 is oriented in a different direction for each of the regions R1, R2, R3, and R4.

Figure 20:
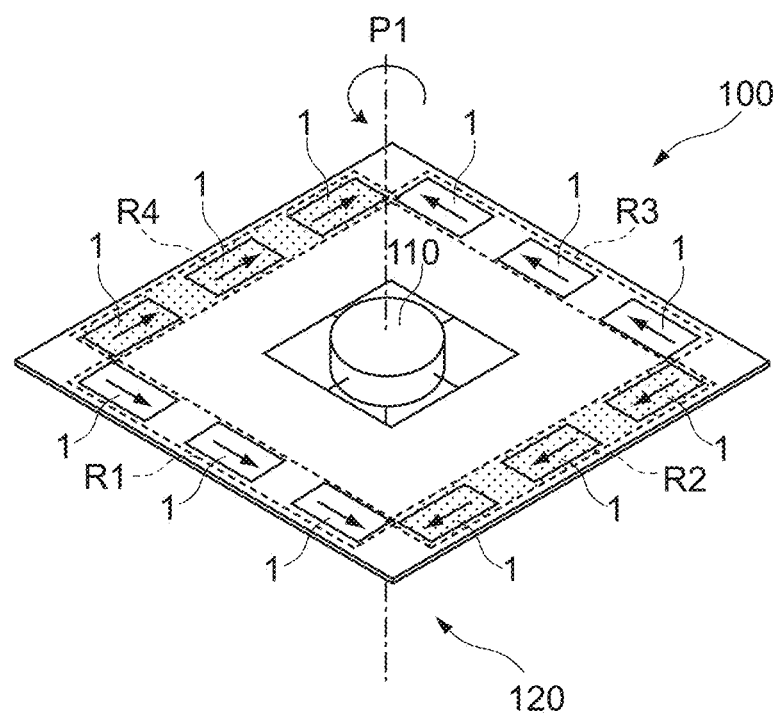
FIG. 20 is a perspective view showing as an example an attitude control method for the spacecraft using the optical devices.
Figure 21:
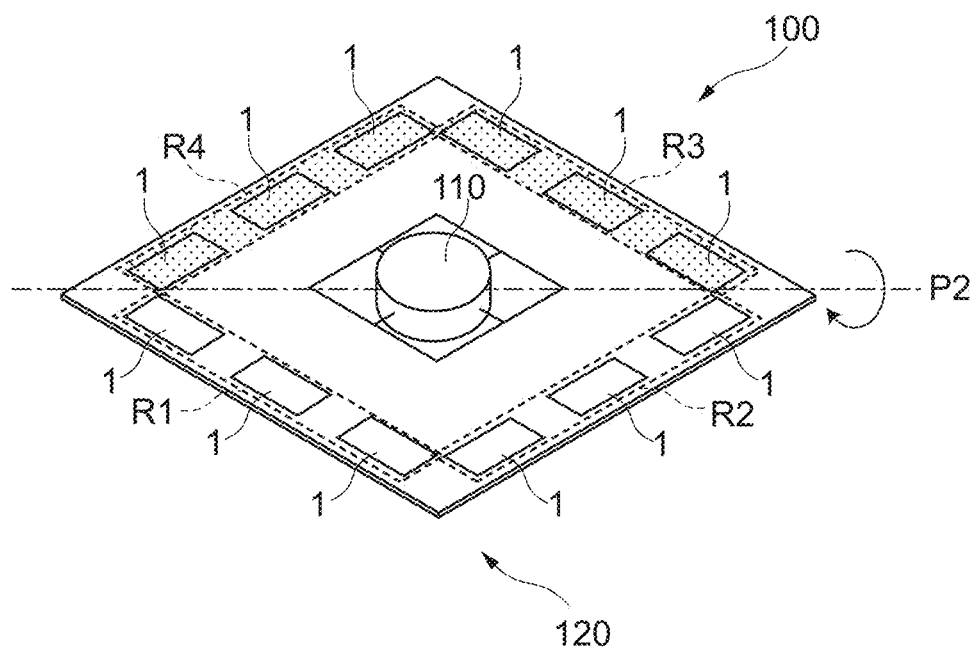
FIG. 21 is a perspective view showing as an example an attitude control method for the spacecraft using the optical devices.

FIGS. 20 and 21 are views showing as an example an attitude control method for the spacecraft 100. In the attitude control method for the spacecraft 100 shown in FIGS. 20 and 21, the optical device 1 is set to the first state or the second state for each of the regions R1, R2, R3, and R4. Accordingly, the magnitude of the radiation pressure to be applied to the regions R1, R2, R3, and R4 can be differentiated.

In the state shown in FIG. 20, the optical devices 1 disposed in the regions R1 and R3 are set to the first state, and the optical devices 1 disposed in the regions R2 and R4 are set to the second state. Thus, in the sail 120, the radiation pressure applied to the regions R1 and R3 has a component of the X-axis direction, and the radiation pressure applied to the regions R2 and R4 does not have the component of the X-axis direction.

The component of the X-axis direction of the radiation pressure applied to the optical devices 1 disposed in the regions R1 and R3 generates moment in a direction shown in FIG. 20 about an axis P1 orthogonal to the light-receiving surface of the sail 120. Thus, in the state shown in FIG. 20, the radiation pressure applied to the regions R1 and R3 can rotate the spacecraft 100 about the axis P1.

To the contrary, the optical devices 1 disposed in the regions R1 and R3 are set to the second state, and the optical devices 1 disposed in the regions R2 and R4 are set to the first state. Thus, the radiation pressure applied to the regions R2 and R4 generates moment in a direction opposite to the direction shown in FIG. 20. Accordingly, the spacecraft 100 can be rotated in the opposite direction from the state shown in FIG. 20.

In the state shown in FIG. 21, the optical devices 1 disposed in the regions R1 and R2 are set to the first state, and the optical devices 1 disposed in the regions R3 and R4 are set to the second state. Thus, in the sail 120, the component of the Z-axis direction of the radiation pressure applied to the regions R1 and R2, and the component of the Z-axis direction of the radiation pressure applied to the regions R2 and R4 are different from each other.

Therefore, the component of the Z-axis direction of the radiation pressure applied to the optical devices 1 disposed in the sail 120 generates, for example, moment in a direction shown in FIG. 21 about an axis P2 along the light-receiving surface of the sail 120. Thus, in the state shown in FIG. 21, the radiation pressure applied to the regions R1 and R2 can rotate the spacecraft 100 about the axis P2.

To the contrary, the optical devices 1 disposed in the regions R1 and R2 are set to the second state, and the optical devices 1 disposed in the regions R3 and R4 are set to the first state. Thus, the radiation pressure applied to the regions R3 and R4 generates moment in a direction opposite to the direction shown in FIG. 21. Accordingly, the spacecraft 100 can be rotated in the opposite direction from the state shown in FIG. 21.

In such a manner, in the spacecraft 100, the optical devices 1 attached to the sail 120 are electrically controlled, and thus rotary movement about an optional axis can be performed using the radiation pressure received by the optical devices 1 from the sunlight. Accordingly, the spacecraft 100 can take an optional attitude without using fuel.

It should be noted that the number or the positions of the optical devices 1 in the spacecraft 100 can be optionally changed. Further, a method of controlling the optical devices 1 in the spacecraft 100 can also be optionally changed. For example, in the spacecraft 100, each optical device 1 is controlled to enter the first state or the second state, and thus further precise attitude control can be performed.

Further, using the optical device 1 allows ultraprecise attitude control, in which disturbance does not substantially occur, for the spacecraft 100 that is capable of receiving sunlight and navigates in space, other than the solar sail. Examples of the spacecraft 100 other than the solar sail include various space probes and various artificial satellites.

4.2 Dimming Window 200

Figure 22:
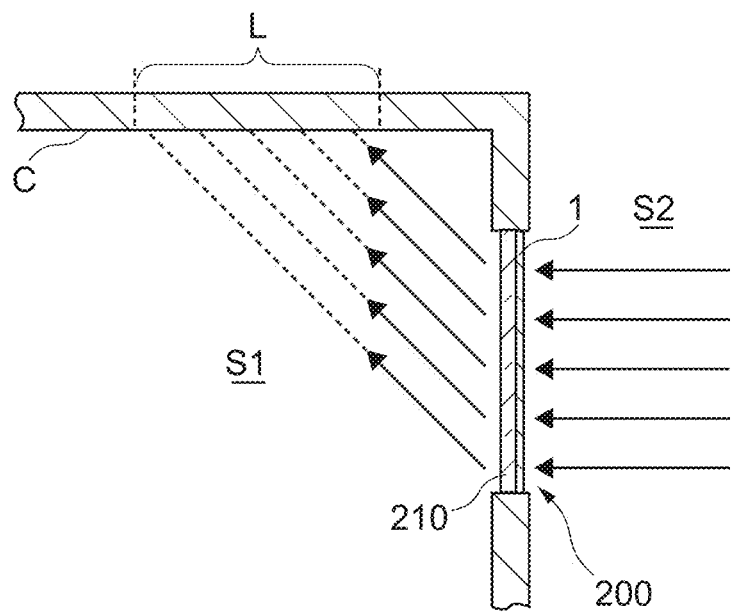
FIG. 22 is a cross-sectional view showing an optical path of light transmitted through a dimming window using the transmissive optical device.
Figure 23:
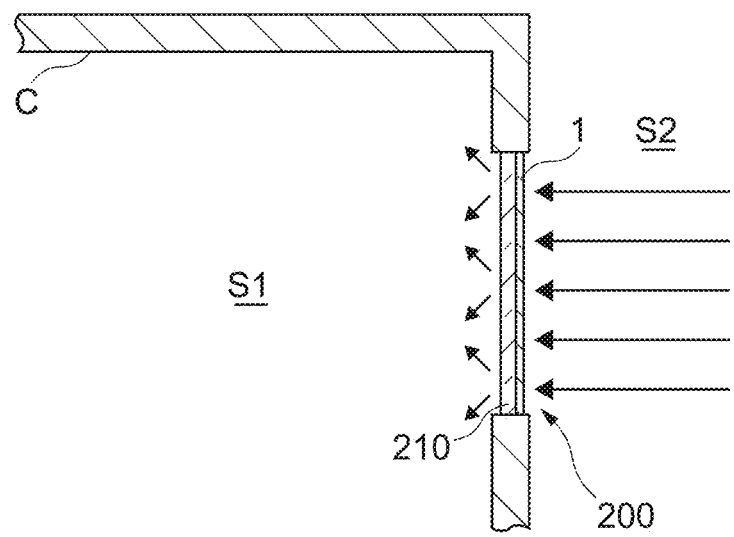
FIG. 23 is a cross-sectional view showing an optical path of light diffused by the dimming window using the transmissive optical device.

FIGS. 22 and 23 are each a cross-sectional view of the dimming window 200 using the transmissive optical device 1. The dimming window 200 is configured by attaching the transmissive optical device 1 to the outer side of a window 210 mounted to a wall of a building, the wall separating an indoor space S1 and an outdoor space S2 from each other. Sunlight is incident on the dimming window 200 from the outdoor space S2.

The optical device 1 shown in FIG. 22 is in the first state. At that time, the sunlight incident from the outdoor space S2 is refracted toward a ceiling C by the optical device 1. Thus, the sunlight transmitted through the dimming window 200 and entering the indoor space S1 is incident on the ceiling C to form an irradiation region L on the ceiling C. The irradiation region L formed on the ceiling C functions as indirect lighting in the indoor space S1.

The optical device 1 shown in FIG. 23 is in the second state. At that time, the sunlight incident from the outdoor space S2 is diffused by the optical device 1. Thus, the dimming window 200 emits diffused light including mixed components of various directions toward the indoor space S1. Thus, the dimming window 200 is recognized as opaque glass from the indoor space S1.

The optical device 1 can be attached to an optional window to obtain a dimming window. Specifically, the optical device 1 can also be attached to, for example, a skylight without being limited to the window 210 provided to the wall of the building as described above. Further, the optical device 1 can also be attached to windows of automobiles, railroad rolling stock, and aircrafts without being limited to windows of buildings.

Further, since the optical device 1 has flexibility, the optical device 1 can be attached to not only a planar surface but also a curved surface. Further, because of its lightness, the optical device 1 can be easily carried when it is rolled up, for example. Therefore, with the optical device 1, a dimming window can be readily obtained in various locations.

4.3 Sunlight Power Generation System 300

Figure 24:
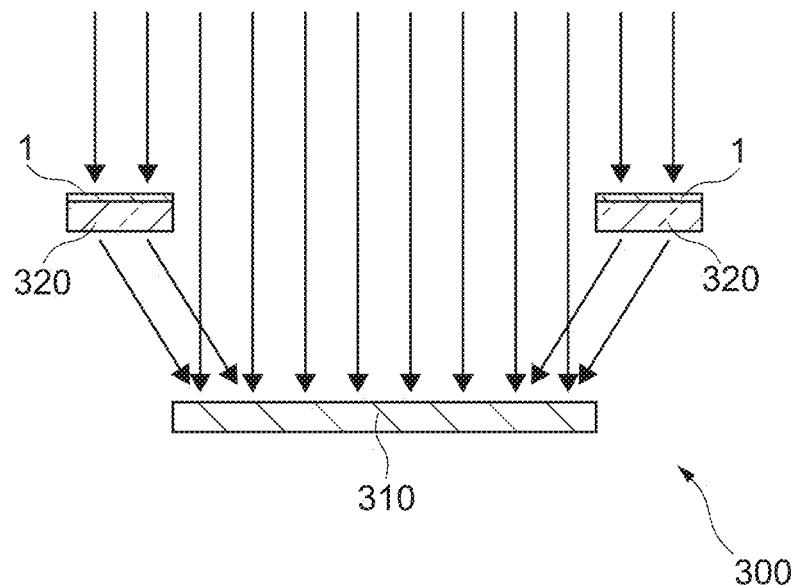
FIG. 24 is a cross-sectional view of a sunlight power generation system using the transmissive optical devices.

FIG. 24 is a cross-sectional view of the sunlight power generation system 300 using the transmissive optical devices 1. The sunlight power generation system 300 includes a solar battery panel 310 and transmissive members 320. Each transmissive optical device 1 is attached to the upper surface of the second base material 20. The solar battery panel 310 is disposed with its light-receiving surface facing upward.

The transmissive members 320 are disposed on the outside of an upper space of the solar battery panel 310. Thus, sunlight is directly incident on the solar battery panel 310. Further, the optical devices 1 in the first state refract the sunlight toward the solar battery panel 310. Accordingly, the sunlight transmitted through the transmissive members 320 is incident on the solar battery panel 310.

In such a manner, in the sunlight power generation system 300, if the optical devices 1 are set to the first state, the amount of light received in the solar battery panel 310 is increased, and thus an electric generating capacity can be increased. Further, in the sunlight power generation system 300, in the case of having a sufficient electric generating capacity, during night time, or the like, the optical devices 1 can be set to the second state.

4.4 Projection System 400

Figure 25:
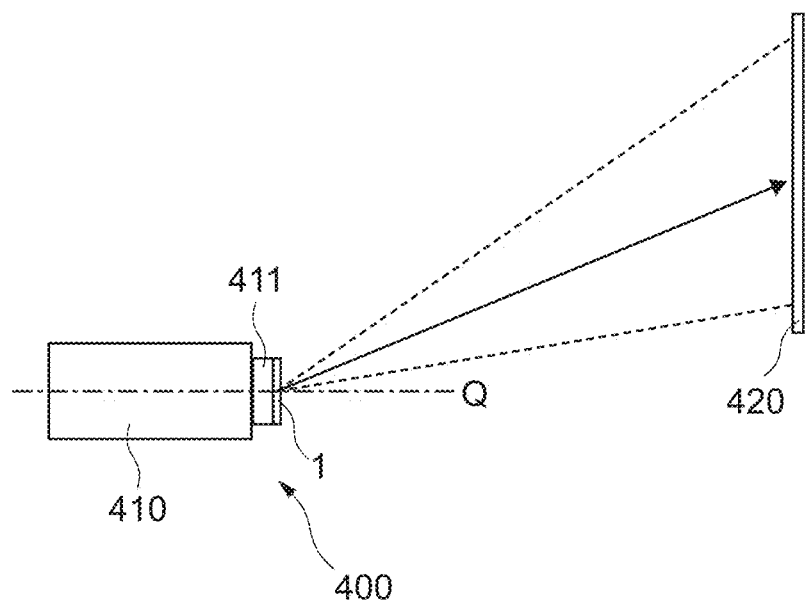
FIG. 25 is a schematic view of a projection system using the transmissive optical device.

FIG. 25 is a schematic view of a projection system 400 using the transmissive optical device 1. The projection system 400 includes a projector 410, which is a projection apparatus including a projection unit 411 that projects videos and images. The transmissive optical device 1 is attached to a light-emitting surface of the projection unit 411.

A screen 420 for displaying videos and images projected by the projector 410 is disposed at a position shifted from a direction along an optical axis Q of the projection unit 411.

Accordingly, the optical device 1 refracts light, which is emitted in the direction along the optical axis Q of the projection unit 411, toward the screen 420.

Thus, in the projection system 400, the videos and images projected from the projection unit 411 and transmitted through the optical device 1 are displayed on the screen 420. In such a manner, using the optical device 1 allows the display positions of the videos and images to be changed without changing the orientation of the optical axis Q of the projection unit 411 by changing the angle of elevation of the projector 410 or the like.

It should be noted that the projection system 400, in which the display positions of the videos and images are changed by using the optical device 1, is not limited to have the configuration using the projector 410. The projection system 400 using the optical device 1 is also applicable to, for example, a head-up display, a rear projection television, a slide projector, or an overhead projector.

REFERENCE SIGNS LIST 1 optical device
10 first base material
20 second base material
30 first electrode film
40 second electrode film
50 liquid crystal layer
51 polymeric material
52 droplet
60 prism surface
61 prism
62 inclined surface
100 spacecraft
200 dimming window
300 sunlight power generation system
400 projection system
PS power supply
SW switch

The invention claimed is:

1. An optical device, comprising:
a first sheet electrically switchable between a first state in which the first sheet extends along an in-plane direction orthogonal to a thickness direction and has transparency in the thickness direction, and a second state in which the first sheet has lower transparency in the thickness direction than the transparency in the first state; and
a second sheet having a prism surface on which an inclined surface inclined with respect to the in-plane direction is arranged along the in-plane direction, the second sheet facing the first sheet in the thickness direction,
wherein the optical device is an attitude control apparatus, and
wherein the first sheet comprises:
a first base material;
a second base material facing the first base material in the thickness direction;
a first planar monolithic electrode film covering an upper surface of the first base material; and
a second planar monolithic electrode film covering a lower surface of the second base material and facing the first planar monolithic electrode film in the thickness direction.

2. The optical device according to claim 1, wherein the first sheet in the second state diffuses light incident in the thickness direction.

3. The optical device according to claim 2, wherein the first sheet includes a liquid crystal layer formed of polymer dispersed liquid crystal.

4. The optical device according to claim 1, wherein the second sheet includes the prism surface on a side of the first sheet.

5. The optical device according to claim 4, wherein the prism surface reflects light transmitted through the first sheet in the thickness direction.

6. The optical device according to claim 4, wherein the prism surface transmits, therethrough, the light transmitted through the first sheet in the thickness direction.

7. A spacecraft, comprising:
a light-receiving surface; and
the optical device according to claim 1 provided to the light-receiving surface.

8. The spacecraft according to claim 7, comprising a plurality of attitude control apparatuses in which inclined surfaces have orientations different from one another.

9. The optical device according to claim 1, wherein the prism surface of the second sheet comprises:
a plurality of prisms along the in-plane direction; and
a plurality of intervals respectively disposed between the prisms of the plurality of prisms, each interval comprising a flat surface that is parallel to the in-plane direction.

\* \* \* \* \*